(12) United States Patent
Kaniz et al.

(10) Patent No.: US 6,990,102 B1
(45) Date of Patent: Jan. 24, 2006

(54) PARALLEL LOOKUP TABLES FOR LOCATING INFORMATION IN A PACKET SWITCHED NETWORK

(75) Inventors: Marufa Kaniz, Sunnyvale, CA (US); Somnath Viswanath, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 982 days.

(21) Appl. No.: 09/851,938

(22) Filed: May 10, 2001

(51) Int. Cl.
*H04L 12/28* (2006.01)
*G06F 15/173* (2006.01)

(52) U.S. Cl. .................. 370/392; 370/389; 709/238
(58) Field of Classification Search ........ 370/389–395, 370/412–418, 422–429, 474, 475; 709/228–245, 709/249, 250
See application file for complete search history.

(56) References Cited

U.S. PATENT DOCUMENTS

| | | | | |
|---|---|---|---|---|
| 6,161,144 | A * | 12/2000 | Michels et al. ............ | 709/238 |
| 6,259,699 | B1 * | 7/2001 | Opalka et al. ............. | 370/398 |
| 6,266,705 | B1 | 7/2001 | Ullum et al. .............. | 709/238 |
| 6,278,714 | B1 * | 8/2001 | Gupta ...................... | 370/422 |
| 6,335,935 | B2 * | 1/2002 | Kadambi et al. .......... | 370/396 |
| 6,453,358 | B1 * | 9/2002 | Michels et al. ............ | 709/238 |
| 6,480,490 | B1 * | 11/2002 | Merchant et al. .......... | 370/389 |
| 6,553,000 | B1 * | 4/2003 | Ganesh et al. ............. | 370/235 |
| 6,553,029 | B1 * | 4/2003 | Alexander ................. | 370/389 |
| 6,580,712 | B1 * | 6/2003 | Jennings et al. ........... | 370/392 |
| 6,678,269 | B1 | 1/2004 | Michels et al. ............ | 370/389 |
| 6,697,873 | B1 | 2/2004 | Yik et al. .................. | 709/238 |
| 6,732,184 | B1 | 5/2004 | Merchant et al. .......... | 709/238 |
| 6,751,225 | B1 | 6/2004 | Chung ..................... | 370/401 |
| 6,804,234 | B1 * | 10/2004 | Chow ...................... | 370/389 |
| 6,810,037 | B1 * | 10/2004 | Kalapathy et al. ......... | 370/392 |
| 6,813,266 | B1 * | 11/2004 | Chiang et al. ............. | 370/389 |
| 2002/0138648 | A1 * | 9/2002 | Liu .......................... | 709/245 |
| 2003/0026259 | A1 | 2/2003 | Brown ..................... | 370/392 |

OTHER PUBLICATIONS

U.S. Appl. No. 09/851,934, filed May 10, 2001.

* cited by examiner

*Primary Examiner*—Man U. Phan
(74) *Attorney, Agent, or Firm*—Harrity & Snyder LLP

(57) ABSTRACT

An address lookup table in a multiport switch is implemented as a plurality of address sub-tables. Entries in the address sub-tables are stored at row addresses based on a hash of the information in the entry. Entries in the address sub-tables are stored in one of the address sub-tables, as determined by pre-selected information relating to the entry. For example, the least significant bit of a source or destination MAC address may be used to select between two address sub-tables. In this manner, the total memory size of the address table can be increased relative to a single address sub-table while decreasing the length of the longest chain and the length of the average chain.

19 Claims, 9 Drawing Sheets

PARALLEL LOOKUP TABLES FOR LOCATING INFORMATION IN A PACKET SWITCHED NETWORK

CROSS-REFERENCE TO RELATED APPLICATIONS

This application is related to the following commonly assigned, copending application, Ser. No. 09/851,934 filed May 10, 2001, and entitled: ALTERNATIVELY ACCESSED PARALLEL LOOKUP TABLES FOR LOCATING INFORMATION IN A PACKET SWITCHED NETWORK.

BACKGROUND OF THE INVENTION

1. Technical Field

The present invention relates generally to switches in a packet switched network, and more specifically, to address lookup tables for locating information relating to packets in a packet switched network.

2. Background Art

In computer networks, a plurality of network stations are interconnected via a communications medium. For example, Ethernet is a commonly used local area network scheme in which multiple stations are connected to a single shared serial data path. These stations often communicate with a switch located between the shared data path and the stations connected to that path. Typically, the switch controls the communication of data packets on the network.

The network switch includes switching logic for receiving and forwarding frames of information to the appropriate destinations. One arrangement for generating a frame forwarding decision uses a direct addressing scheme, where the network switch includes an address table storing switching information for the destination addresses.

For example, a frame may be received by the network switch with header information indicating the source address and destination address of the frame. The switching logic accesses the address table using the source address and destination address as lookups to find the appropriate frame forwarding information. The switch then uses this information to send the frame to the appropriate destination.

When all of the stations connected to the network are simultaneously operating, packet traffic on the shared serial path can be heavy with little time between packets. Accordingly, it is desirable to look up the frame forwarding information in the address lookup table as quickly as possible. By increasing the size of the lookup table, more information can be stored, thus increasing the chances that the frame forwarding information will be found in the lookup table, and thus potentially decreasing the average time to determine the frame forwarding information. Increasing the size of the lookup table, however, also has the undesirable property of increasing the average time to perform each lookup.

Thus, there is a need in the art to improve the functionality of the lookup table in network switches, such as an Ethernet switch.

SUMMARY OF THE INVENTION

Objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, a first aspect of the present invention is directed to a multiport switch. The switch comprises a plurality of elements, including: receive ports, transmit ports, and an internal rules checking circuit. The internal rules checking circuit is connected to the receive ports and determines frame forwarding information for received frames. The internal rules checking circuit includes a plurality of address lookup tables, each of the address lookup tables including a plurality of addressable table entries for holding information relating to the frames. Additionally, each of the addressable table entries includes a port vector field that identifies ports corresponding to frames of the addressable table entries and an address field that identifies network addresses of the frames. The internal rules checking circuit, when performing a write operation to one of the plurality of address lookup tables, determining the one of the plurality of address tables to write to based on information in the received frame corresponding to the write operation.

A second aspect of the present invention relates to a method of using a lookup table implemented with a first lookup sub-table and a second lookup sub-table. The method comprises: calculating a row address of the lookup table based on a hash value of a network address associated with an entry in the lookup table; determining whether the information is to be stored in the first or the second sub-table based on a pre-selected bit in the information; and accessing the entries stored in the lookup table by reading entries stored at a desired address in the first and second sub-tables.

Another aspect of the present invention is directed to a method of storing information in a lookup table implemented as first and second sub-tables. The method comprises: calculating a first row address that the information is to be stored at; determining whether the information is to be stored in the first or the second sub-table based on where the previous entry at the first row address was stored; and storing the information in the determined sub-table in the first available entry at the first row address as a table entry.

BRIEF DESCRIPTION OF THE DRAWINGS

The accompanying drawings, which are incorporated in and constitute a part of this specification, illustrate an embodiment of the invention and, together with the description, explain the invention. In the drawings.

BEST MODE FOR CARRYING OUT THE INVENTION

The following detailed description of the invention refers to the accompanying drawings. The detailed description does not limit the invention. Instead, the scope of the invention is defined by the appended claims and equivalents.

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
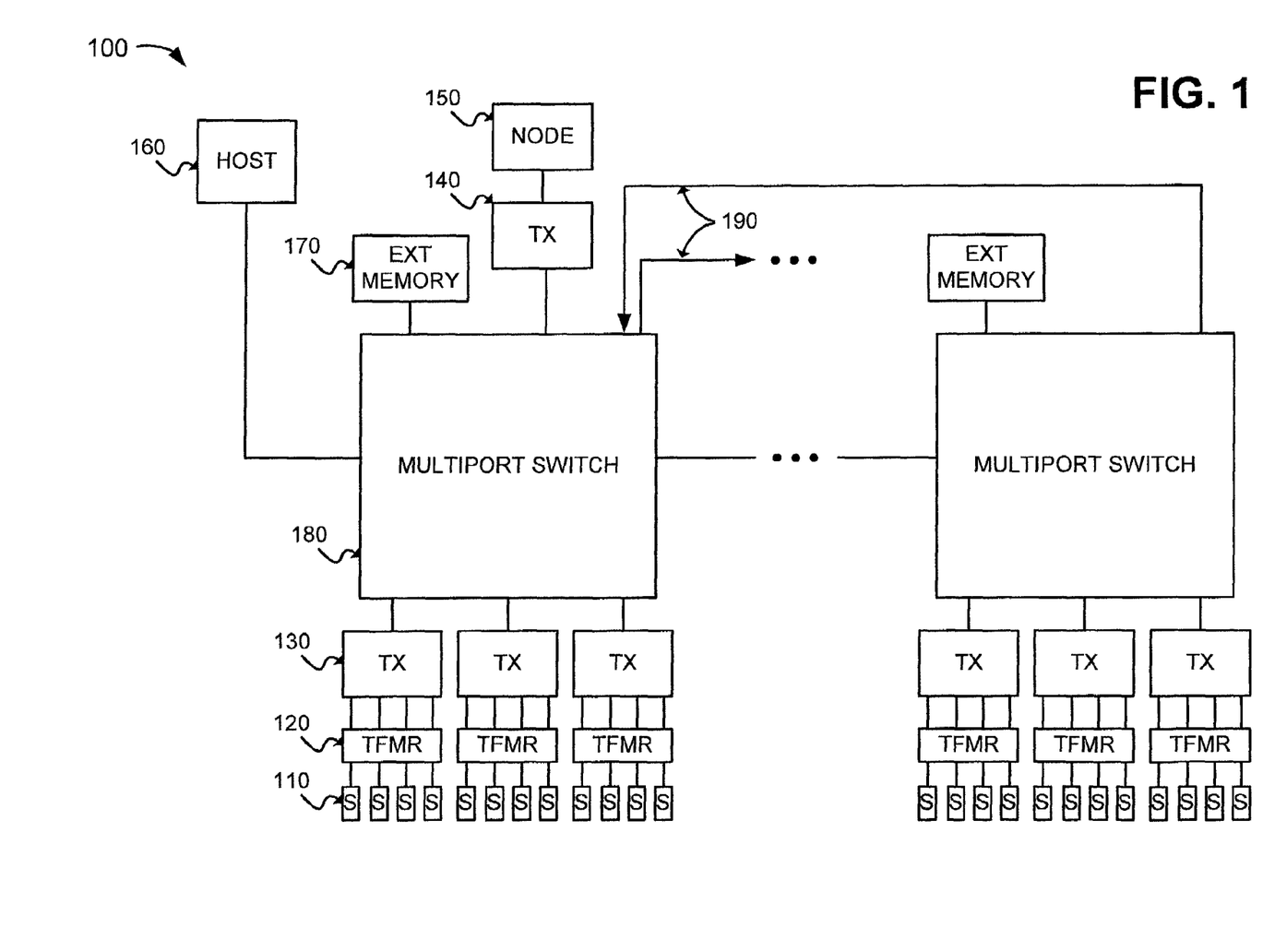
FIG. 1 is a block diagram of an exemplary system in which systems and methods consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128 K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
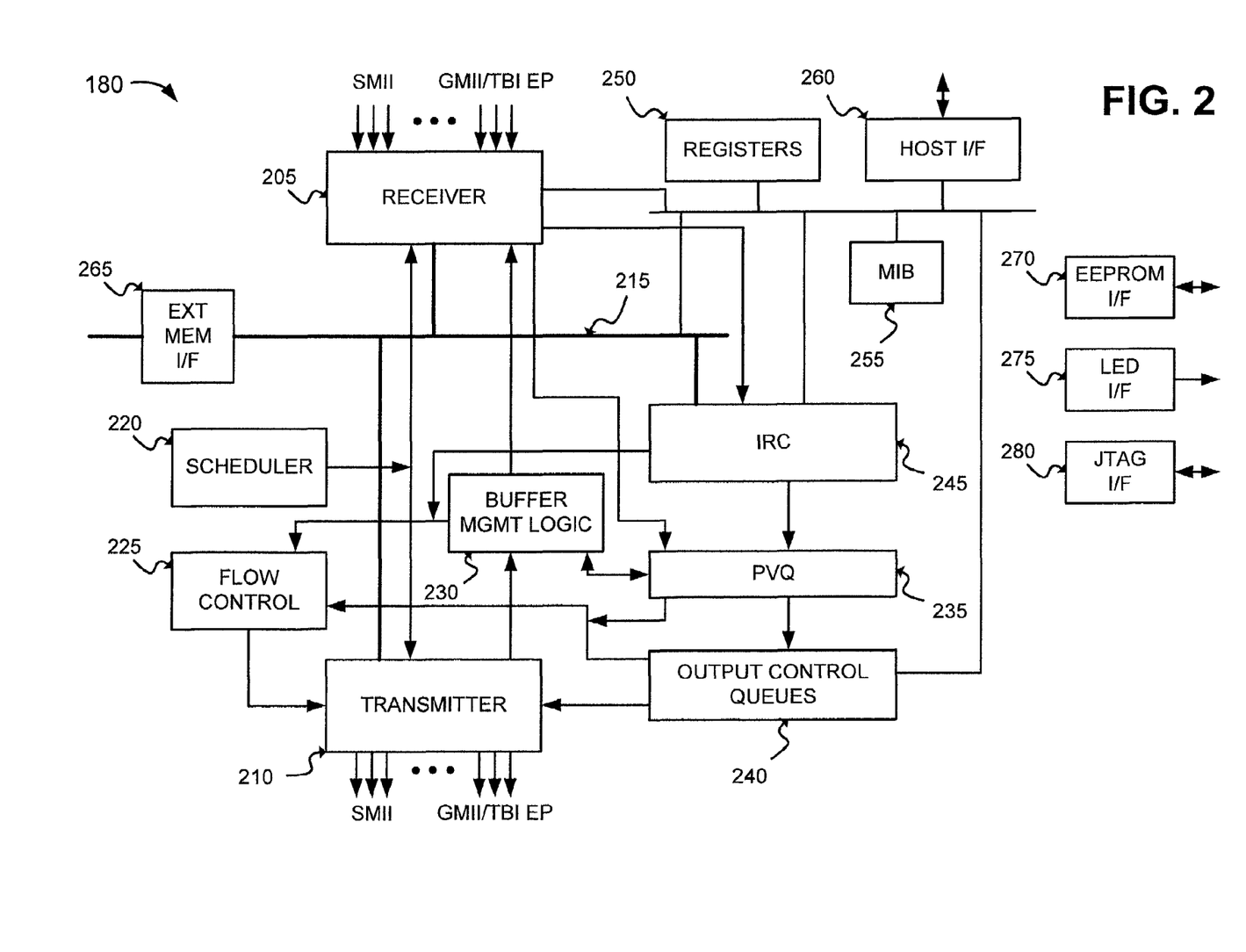
FIG. 2 is a detailed diagram of a multiport switch according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, firstout (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

Figure 3:
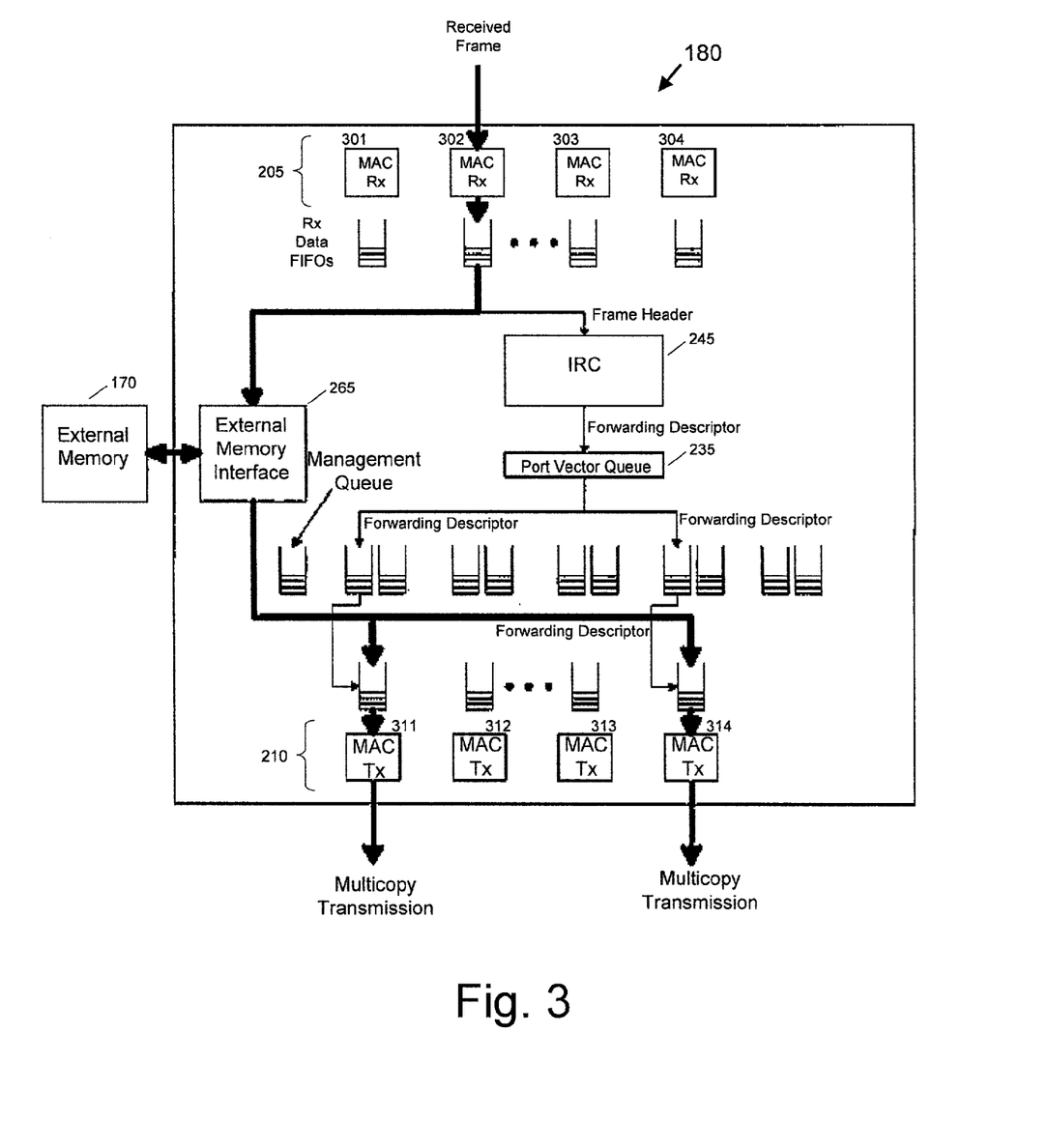
FIG. 3 is a diagram illustrating the data flow path of a frame through a multiport switch.

FIG. 3 is a diagram illustrating, at a high level, the data flow path of a frame through multiport switch 180. Each frame is received at one of the ports, labeled as ports 301–304, in MAC receiver 205. Each frame includes a header portion and a body (frame data) portion. To conserver memory on switch 180, the multiport switch splits the header portion from the data portion. The data portion may then be stored, by external memory interface 265, off-chip in external memory 170. The header is forwarded to IRC 245. Based on the information in the header, IRC 245 determines, using an address lookup table, the correct transmit port(s) 210 from which the frame is to be transmitted from. The frame is then input to PVQ 235, and after being reunited with its data portion, is transmitted on the appropriate one of the MAC transmission ports 210, labeled as ports 311–314.

As shown in FIG. 3, a frame is received on receive port 302 and transmitted from ports 311 and 314. This is called a multicast transmission. Frame transmission at one port is referred to as a unicast transmission.

Figure 4:
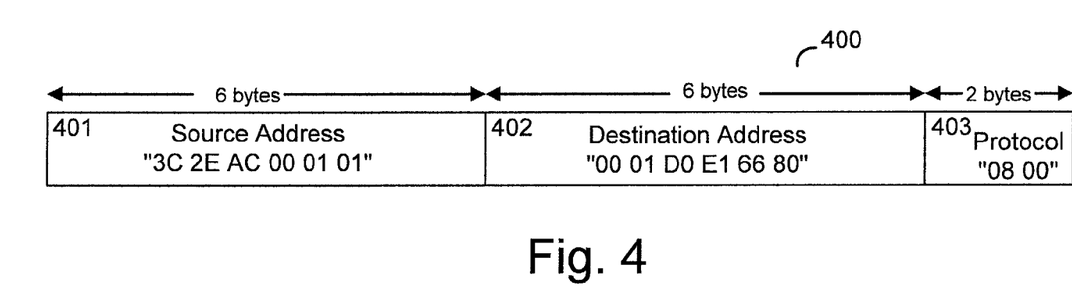
FIG. 4 is a diagram illustrating the header portion of an Ethernet frame.

FIG. 4 is a diagram illustrating the header portion of an Ethernet frame. Header 400 contains three fields: source address field 401, destination address field 402, and protocol field 403. The source address field is six bytes (48 bits) in length and identifies the node address of the source of the frame. Similarly, the destination address field 402 is a six-byte field that uniquely identifies the destination address. The source and destination address are also referred to as Media Access Control (MAC) addresses. Each MAC address is a unique number that distinguishes the network device with that particular device from all other network devices. No two networking devices should typically be assigned the same MAC address.

Protocol field 403 is a two byte field that represents the protocol that the Ethernet header 400 is framing. In the example shown, the value of the protocol field 403 is hex 0800, which represents the IPv4 protocol.

The foregoing description of the switch architecture provides an overview of the switch operations in a packet switched network. A more detailed description of the features of the present invention as embodied, for example, in the multiport switch 180, is provided below.

Determining the Frame Forwarding Information

As previously discussed, one of the functions performed by IRC (internal rules checker) 245 is determining the correct frame forwarding information for a received frame. This determination is made with the aid of an address lookup table.

More specifically, IRC 245 uses the destination address field 402 of header 400 to generate a frame forwarding descriptor that identifies each transmission port 311–314 that should receive the frame. The structure of a frame forwarding descriptor is shown in more detail in FIG. 5.

Figures 5, 7:
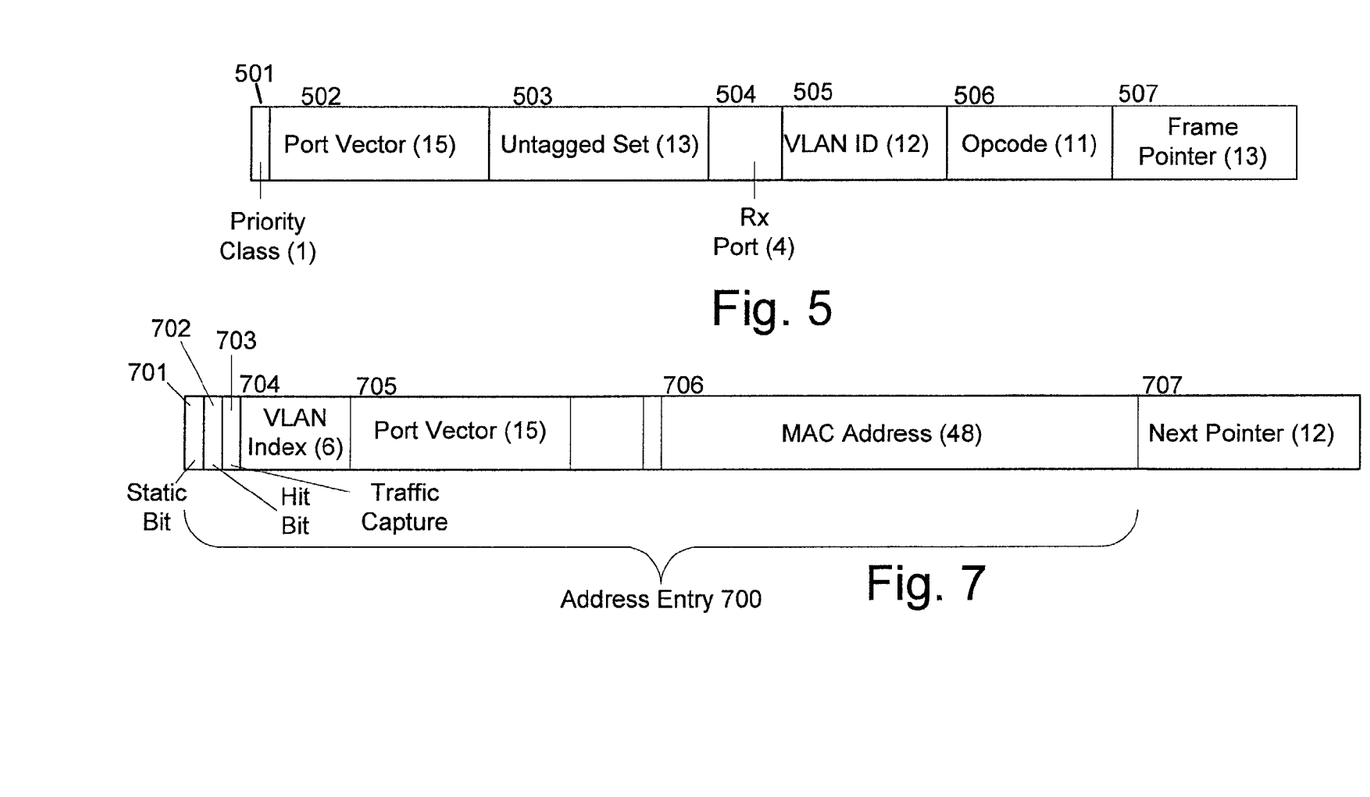
FIG. 5 is a diagram illustrating the structure of a frame forwarding descriptor.
FIG. 7 is a diagram illustrating the composition of an address table entry.

Referring to FIG. 5, the priority class field 501 is a one-bit field that indicates the output priority queue in which the frame pointer should be placed, e.g., high priority or low priority. The port vector field 502 is a 15-bit field that identifies each port(s) that should receive the data frame for transmission to its destination address. For example, bit 0 of the port vector field corresponds to port 0 (the management port) and bits 1–12 correspond to MAC ports 1–12 respectively (the 10/100 Mb/s ports).

The untagged set field 503 is a 13 bit field that indicates which ports should remove VLAN tag headers before transmitting frames. The untagged set is obtained from an untagged set table. The Rx port field 504 is a four-bit field that indicates the port from which the frame was received.

The VLAN ID field 505 is a 12-bit field that includes the VLAN identifier associated with the frame. The opcode 506 is an 11-bit field that contains instructions about how the frame should be modified before transmission and information that the host CPU 160 can use for processing frames from the management queue. The frame pointer 507 is a 13-bit field that contains the location of the frame stored in external memory 170.

Figure 6:
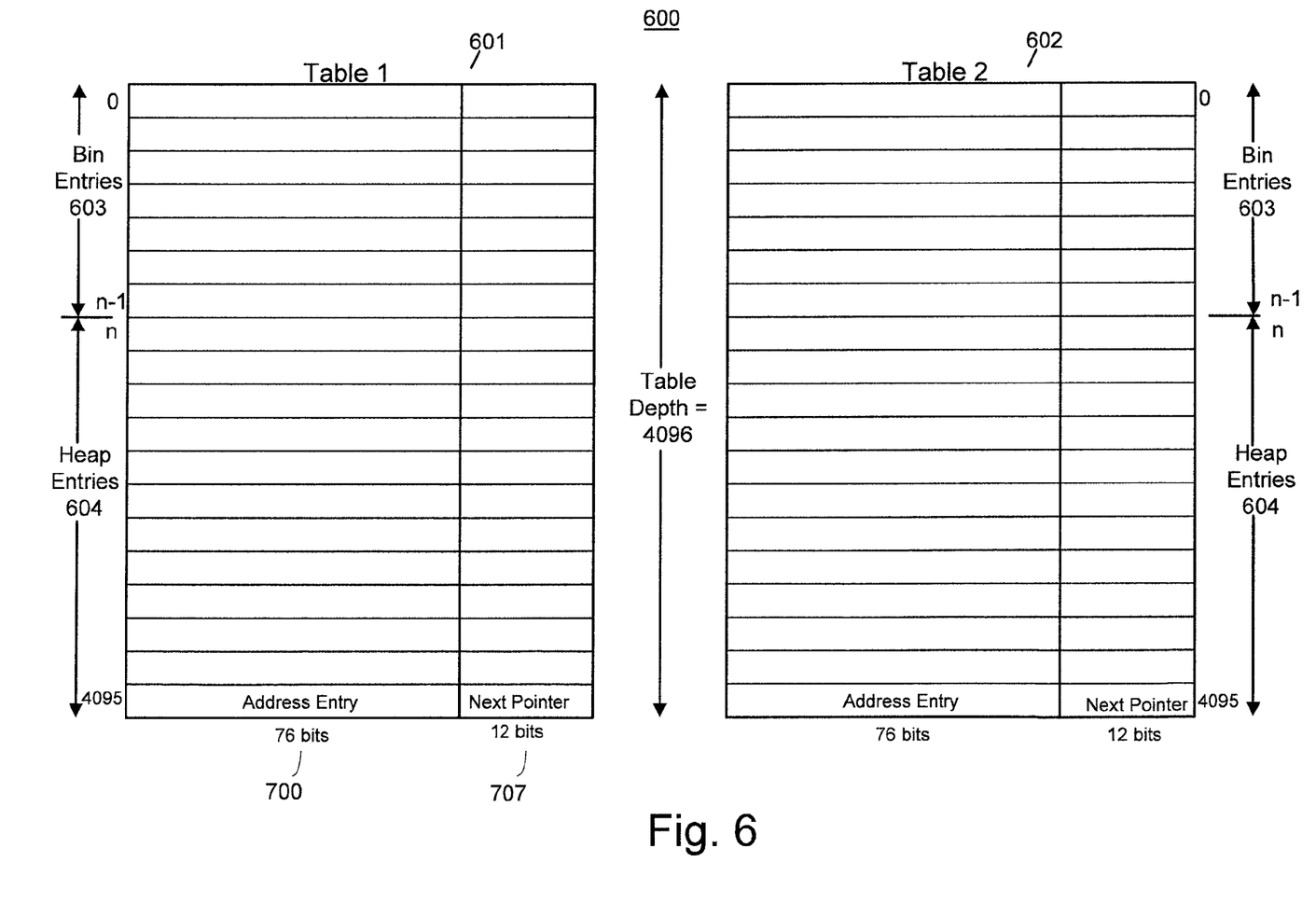
FIG. 6 is a diagram illustrating the organization of an address table consistent with an aspect of the present invention.

FIG. 6 is a diagram illustrating the organization of the address table 600 consistent with an aspect of the present invention. Address table 600 is constructed as a plurality of individual address tables. In an exemplary implementation of the present invention, two address tables, illustrated in FIG. 6 and labeled as address sub-tables 601 (Table 1) and 602 (Table 2), are included.

Sub-tables 601 and 602 each contain an array of 4096 entries. The first "n" entries 603 are referred to as "bin entries" and have addresses from "0" to "n-1". The remaining entries 604 are referred to as "heap entries" and have addresses from "n" to "4095". Each of the table entries includes a 76-bit address entry field and a 12-bit "next pointer" field, for a total of 88 bits per table entry. As illustrated, each sub-table 601 and 602 may include 1024 bin entries and 3072 heap entries (i.e., n-1024).

FIG. 7 illustrates the composition of each 88-bit table entry shown in FIG. 6. Each entry is generally divided into an address entry 700 and a next pointer field 707. Address entry section 700 includes a number of fields. The hit bit 702 is used for address entry "aging" to delete entries from the address table 600 that have not been used in a predetermined amount of time. The static bit 701 is used to prevent deletion of an address entry. The traffic capture bit 703 identifies traffic capture source and destination MAC addresses for mirroring MAC conversations to the management queue.

The VLAN index field 704 is a 6-bit field used to reference a 12-bit VLAN identifier (ID). A separate table (not shown) stored in IRC 245 maps the 6-bit value in the VLAN index field 704 to its corresponding 12-bit VLAN identification.

The port vector 705 is a 15-bit field that references port(s) to which the frame should be forwarded. The MAC address field 706 is a 48-bit field that stores the MAC address corresponding to the source or destination address of the frame. The next pointer 707 references the next 88-bit table entry in a chain (described in more detail below).

IRC 245 uses address table 600 for source address (SA) and destination address (DA) checking. SA entries in table 600 are 88-bit table entries based on the source address 401 in the MAC address field 706. DA entries are 88-bit table entries based on the destination address 402 in the MAC address field 706.

IRC 245 uses the SA table entries to keep track of active source addresses. When a frame from an address is received, that source address is entered into the address table 600 as being an active source address. If no new frames are received from the address for a predetermined period, the SA entry may be removed.

IRC 245 uses the DA table entry to pre-store the port vector fields 705 that correspond to the destination address. In this manner, the port vector field 705 corresponding to a particular address can be quickly accessed. If the destination address is not present in table 600, IRC 245 "learns" the appropriate port vector 705 by flooding the frame to all possible ports. This is a relatively computationally burdensome and time-intensive process.

IRC 245 determines in which row to place each 88-bit table entry based on a hash using the 48-bit MAC address. For SA table entries, the hash is based on the MAC source address field 401; for DA table entries, the hash is based on the MAC destination address field 402. A hash function, in general, generates an output value within a certain range based on an input value. For example, a hash function consistent with the present invention generates a 10 bit output value (i.e., a value between 0 and 1023) based on an input 48 bit value (i.e., the MAC address). The output hash value is then directly used to address one of the 1023 bin entries in tables 601 and 602. Other information, such as the VLAN Index, may be concatenated with the 48-bit MAC address and used as the input to the hash function.

Because the possible output range of hash values (10 bit) is less than the range of possible hash input values (48 bits), multiple input values may produce the same output hash value. This is called a collision. Collisions are handled using the next pointer field 707. When a collision occurs, the value that was to be stored in the bin entry at which there is a collision is stored instead in the next open heap entry 604. The next pointer field 707 of the table entry is set by IRC 245 to be the address of the heap entry in the table. In this manner, multiple colliding entries in tables 601 or 602 may be "chained" together through the next pointer field. The resultant chain defines a linked list of entries.

Figure 8:
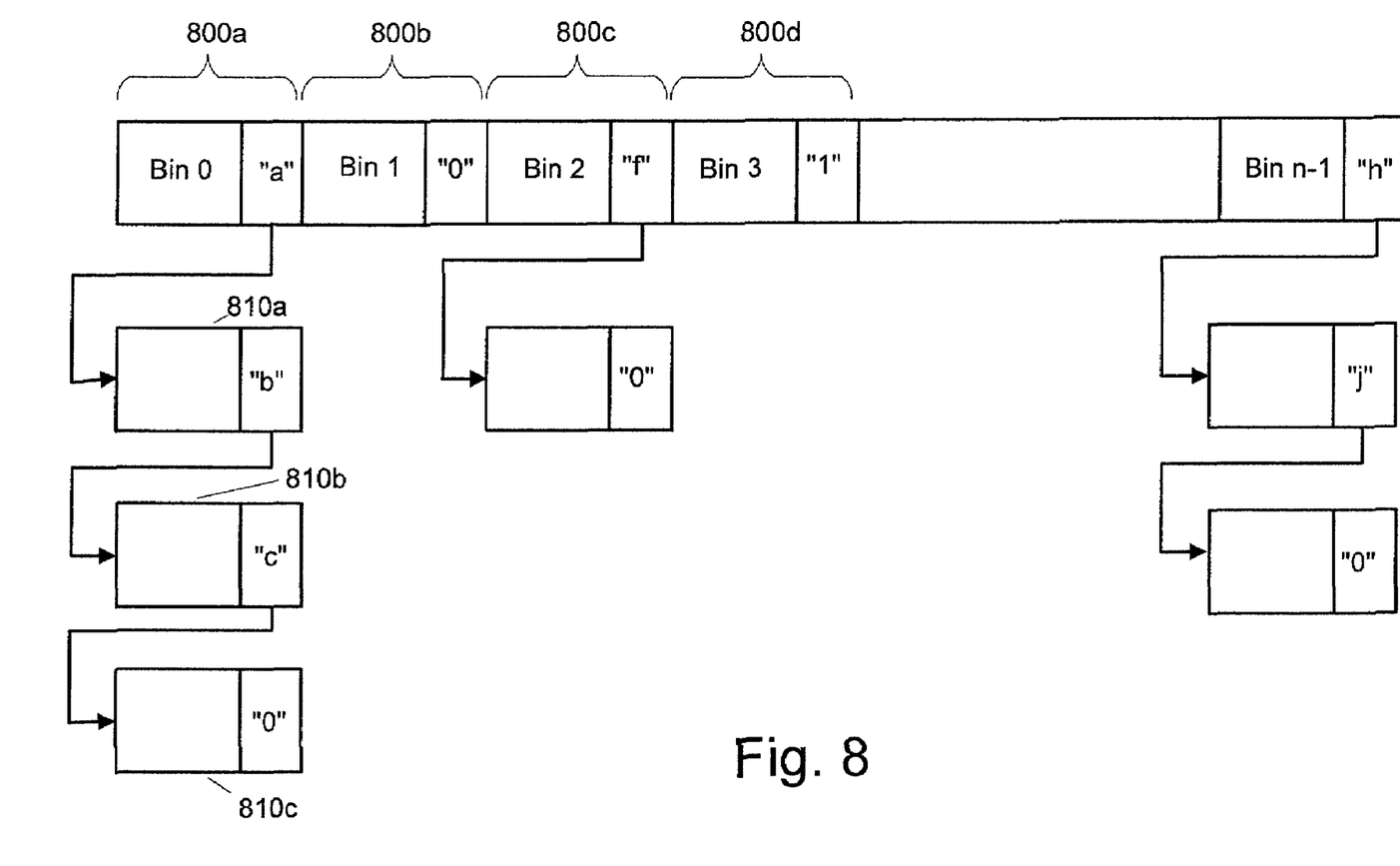
FIG. 8 is a diagram illustrating chains of entries in an address table.

FIG. 8 is a diagram illustrating chains of entries in table 601 or 602. The next pointer field associated with bin entry 800 identifies the location of the next entry in the chain of linked list addresses. For example, bin 3, 800*d*, does not have any associated table entries. In such a case, the 76-bit address entry equals zero (or another null value), and the bin's corresponding next pointer field has a value of "1", indicating no entries for the corresponding bin.

If a bin such as bin 1, 800*b*, contains a single table entry, the bin entry will store the switching logic data for that single address in its address entry field, and store the value "zero" in the next pointer field, indicating there are no further address entries in the chain. Bin 0, 800*a*, however, references three addresses 810*a*–810*c* by using the next pointer field to identify the location of the next entry in the chain. Bins 810*b* and 810*c* are linked in a linear list, as shown in FIG. 8. Thus, the first entry of bin 0 is stored in the address entry field of the bin entry 800*a* and the next entry (heap entry 810*a*) is referenced by address entry "a" in the next pointer field of the bin entry 800*a*.

As previously mentioned, IRC 245 stores SA and DA entries in address table 600. When IRC 245 first encounters a frame with a source or destination address that is not in the address table, the IRC 245 may learn the correct table entry for that frame. Learning the port vector field for a DA table entry, for example, involves flooding the frame to all possible ports to determine the correct port. Learning the correct values for the SA and DA entries is known in the art, and thus will not be discussed in further detail herein.

Figure 9:
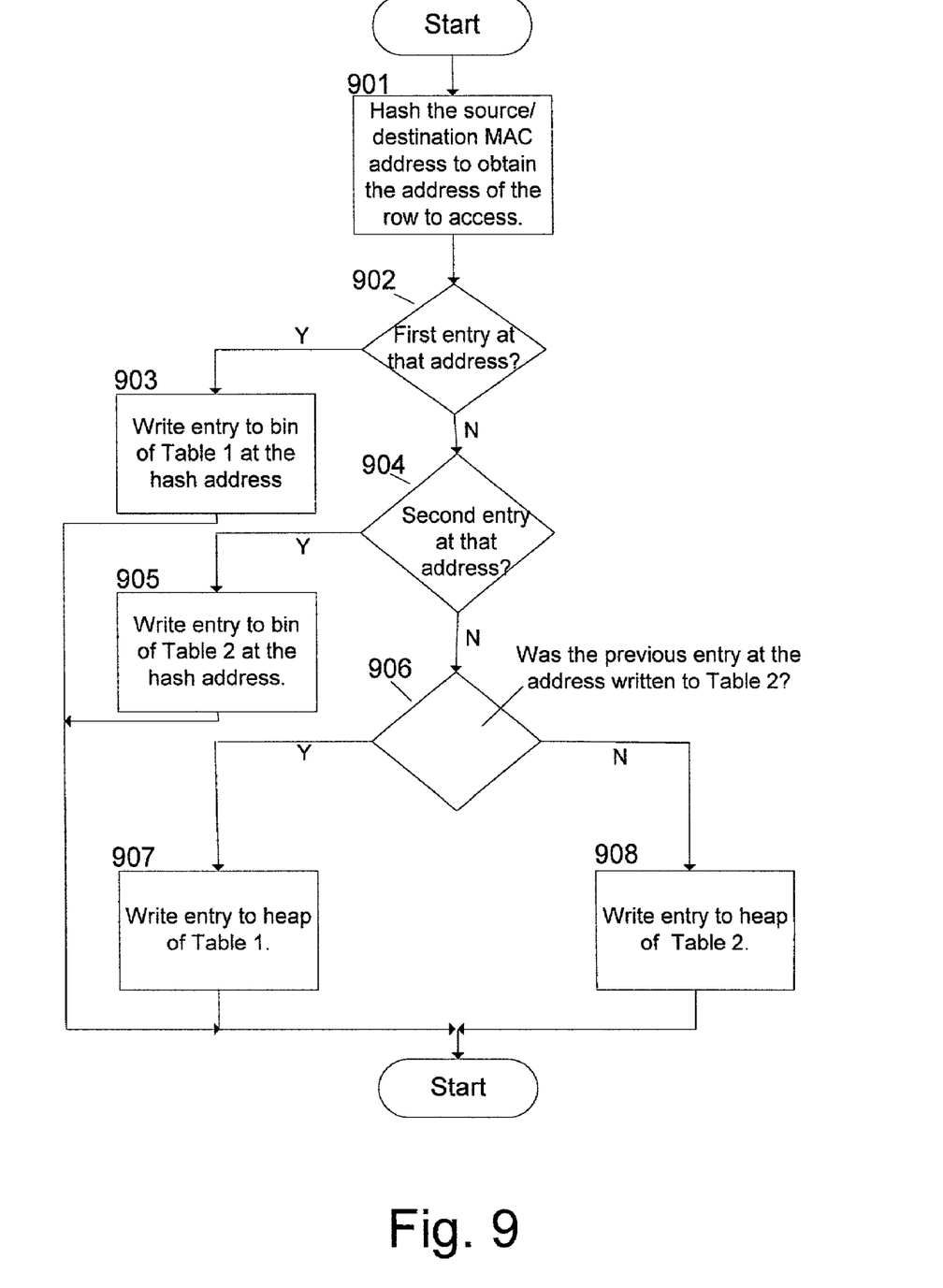
FIG. 9 is a flow chart illustrating methods consistent with the present invention through which learned address table entries are written to the address table.

FIG. 9 is a flow chart illustrating methods consistent with the present invention through which IRC 245 writes learned address entries to address tables 600. IRC 245 begins by hashing the source or destination MAC address as described above. (Step 901). The output hash value is the address in sub-table 601 or 602 to which IRC 245 writes the address entry. If this is the first entry at a particular address, IRC 245 writes the entry into the bin field of sub-table 601. (Steps 902, 903). If the entry is the second entry at the hashed address, IRC 245 writes the entry into the bin field of sub-table 602. (Steps 904, 905). Subsequent entries are alternated between the hash fields of sub-tables 601 and 602. (Acts 906, 907, and 908). Thus, the third entry is written to the heap of table 601, the fourth entry is written to the heap of table 602, the fifth entry is written to the heap of table 601, etc. In this manner, entries to sub-tables 601 and 602 are uniformly distributed so that the chain length beginning at any particular bin address will be approximately equal in both sub-tables.

The IRC 245 performs hash searches of the IRC address tables 601 and 602 to find entries associated with the source MAC address and the destination MAC address. More particularly, when searching for a particular entry in table 601 or 602, the IRC 245 performs a hash using the same information used when writing the table entry (e.g., a value including the source or destination MAC address). The address entry 700 corresponding to the resultant hash value is then examined in both tables 601 and 602. If the examined address entry is a hit (i.e., if the MAC address and the VLAN field match that of the input frame), the search is complete. If it is not a hit, and the next pointer field indicates that there is another entry 700 in the chain, IRC 245 checks the entry referenced by the next pointer field. In this manner, chains of entries are searched serially, starting with the first bin in the chain.

Because two address tables 601 and 602 are used to store the table entries, the longest chain length and the average chain will tend to decrease, as compared to using just one table. IRC 245 may also use two search circuits, one dedicated to each of tables 601 and 602, to simultaneously search address tables 601 and 602. Advantageously, the average time to find an entry will decrease, while the total memory devoted to the address table 600 has increased.

Figure 10:
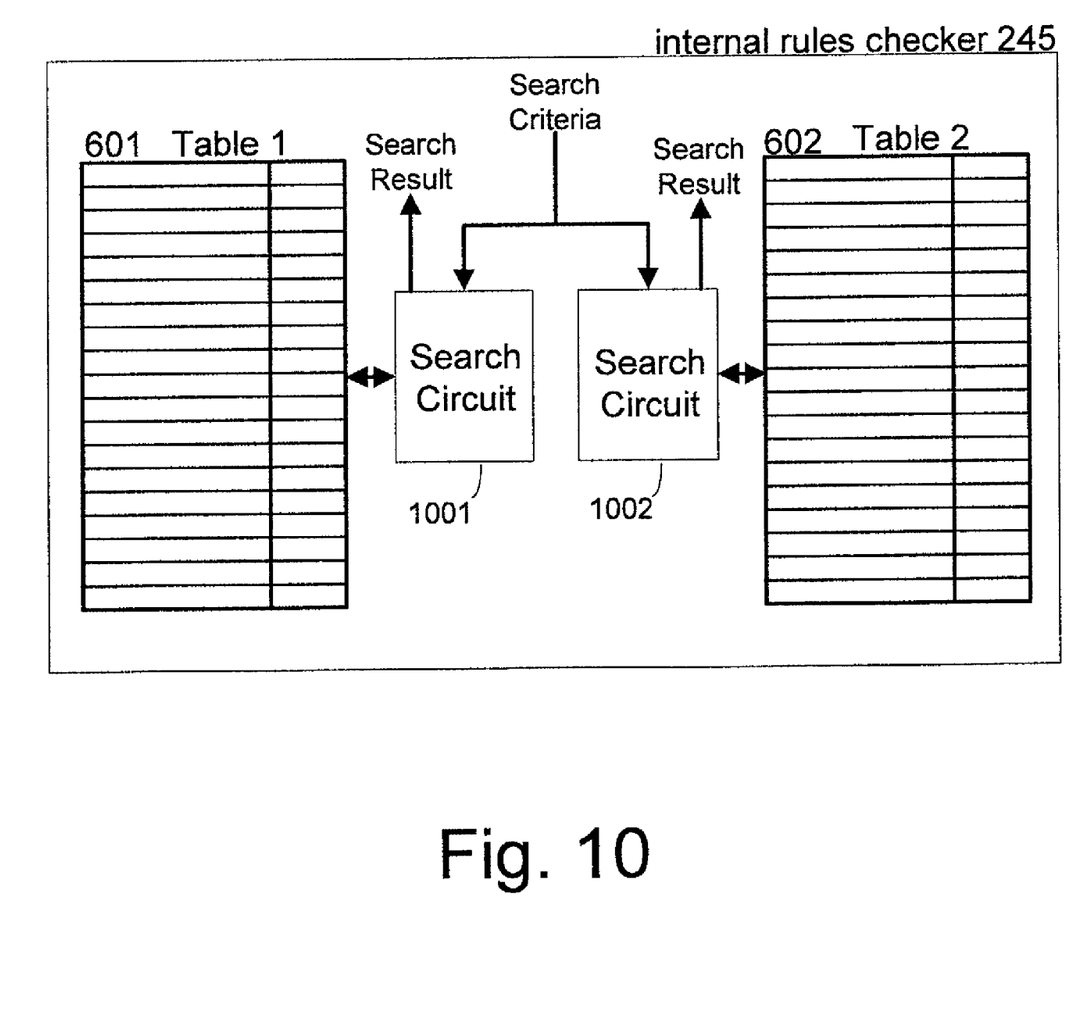
FIG. 10 is a block diagram illustrating the relationship between the search circuits and the internal rules checker.

FIG. 10 is a block diagram illustrating the relationship between the search circuits 1001 and 1002. Search circuits 1001 and 1002 receive the search criteria, such as the row address of the relevant entry in tables 601 and 602, the MAC address, and the VLAN field. With this information, search circuits 1001 and 1002 simultaneously search their respective address tables 601 and 602. The results of the search (i.e., whether or not there is a hit and the address entry of the hit) may then be retained by search circuits 1001 and 1002.

As discussed above, the average chain length and thus the average time to access address table 600 is decreased by splitting address table 600 into two sub-tables and alternating the writing of entries to the address table at any particular bin address.

Figure 11:
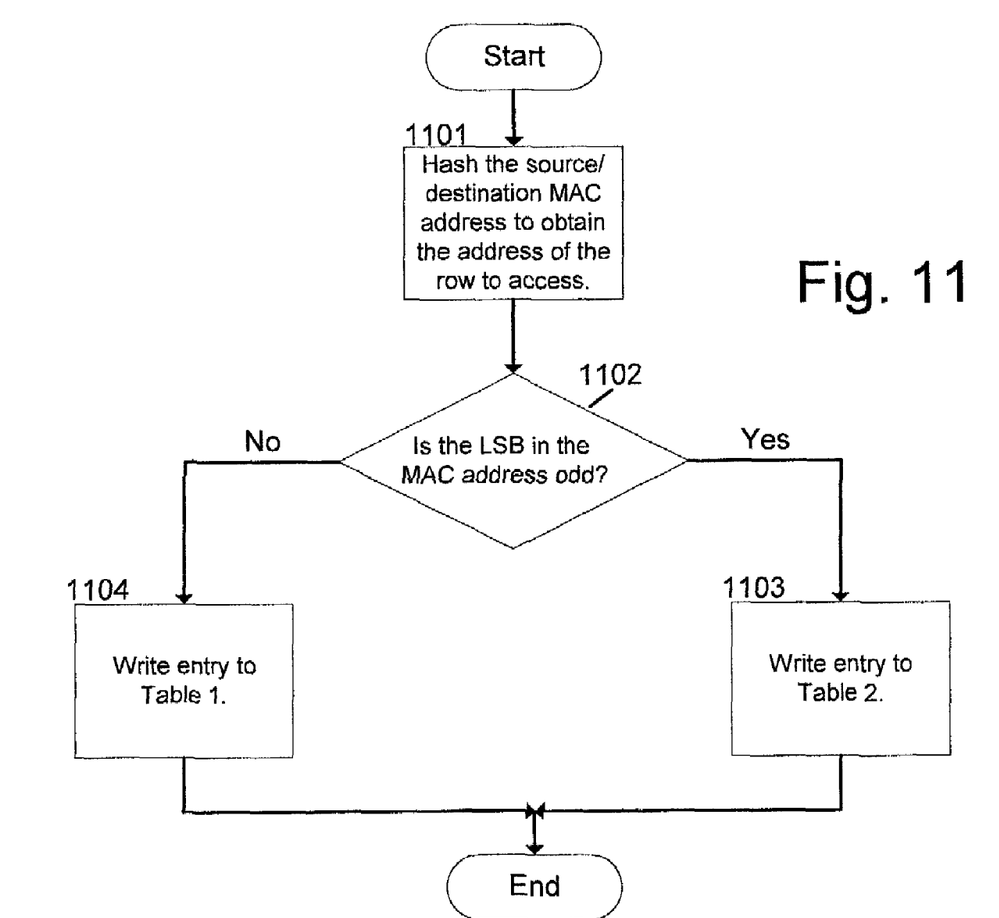
FIG. 11 is a flow chart illustrating additional methods consistent with the present invention for writing address table entries to the address table.

An alternative implementation for writing address table entries will next be described with reference to the flow chart of FIG. 11. As with the previous embodiment, IRC 245 uses a hashing function to generate an address value between zero and n-1. (Step 1101). Whether the value is written to sub-table 601 or 602, however, is based on information external to the output hash value. As shown in FIG. 11, the table entries are written to sub-table 601 when the least significant bit (LSB) of the MAC address is even, and written to sub-table 602 when the LSB of the MAC address is odd. (Steps 1102, 1103, and 1104). Because the distribution of the LSBs of the incoming MAC addresses are essentially random, the number of entries in sub-tables 601 and 602 will, on average, be approximately equal. Therefore, relative to a single address table, the average chain length and the longest chain lengths will decrease, thus decreasing the time required to search an entire chain.

Internal rules checker 245 may search the address sub-tables 601 and 602, which were filled using the method of FIG. 11, in a manner similar to that described with reference to FIG. 10. In particular, as shown in FIG. 10, multiple search circuits 1001 and 1002 may be used to quickly search the addressed tables. Alternatively, a single search circuit connected to both address tables 601 and 602 may search one of address sub-tables 601 and 602, as determined by the LSB of the MAC address.

Although the technique described above uses the LSB of an incoming MAC address to determine which table to write to, other information could be used to determine the table to write to, such as, for example, a bit from the VLAN index, or a bit from a second hash value based on a concatenation of the MAC address and the VLAN index.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although the preceding description generally discussed an address table composed of two sub-tables, one of ordinary skill in the art will recognize that three or more address tables could be used to even further increase the parallelism of the table search procedure. In addition, the particular size of the address table may be modified in other implementations consistent with the present invention.

The scope of the invention is defined by the claims and their equivalents.

What is claimed is:

1. A multiport switch comprising:
   a plurality of receive ports, the receive ports receiving frames in a network, the frames having a source field indicating the source of the frame and a destination field indicating an intended destination for the frame;
   a plurality of transmit ports, the transmit ports configured to transmit the frames in the network; and
   a logic circuit coupled to the receive ports and configured to determine frame forwarding information for the received frames, the logic circuit including a plurality of address lookup tables, each of the address lookup tables including a plurality of addressable table entries for storing information relating to the frames, each of the addressable table entries including at least a port vector field that identifies ports corresponding to the frames of the addressable table entries and an address field that identifies network addresses of the frames, the logic circuit, when performing a write operation to one of the plurality of address lookup tables, determines the one of the plurality of address tables to write to based on the least significant bit of one of the source field or the destination field of the received frame.

2. The multiport switch of claim 1, wherein the plurality of receive and transmit ports are media access control (MAC) ports in an Ethernet network.

3. The multiport switch of claim 1, wherein the plurality of address lookup tables includes a first address lookup table and a second address lookup table, the logic circuit determining the address of the addressable table entries to write to based on a hash value generated using the network address of the frame.

4. The multiport switch of claim 3, wherein multiple entries written to the same address in the address tables are chained together serially.

5. The switch of claim 4, wherein the logic circuit includes a search circuit that searches for a desired address in the first and second address lookup tables based on the least significant bit of one of the source field or the destination field of the received frame.

6. The multiport switch of claim 5, wherein the internal rules checking circuit determines the frame forwarding information based on the result of the search by the search circuit.

7. A method of using a lookup table implemented with a first lookup sub-table and a second lookup sub-table, the method comprising:
   calculating a row address of the lookup table based on a hash value of a network address associated with an entry in the lookup table;
   storing the entry in one of the first sub-table and the second sub-table at the calculated row address by writing the entry to the one of the first sub-table or the second sub-table based on a pre-selected bit in the network address; and
   accessing the entries stored in the lookup table by reading entries stored at a desired address in the first and second sub-tables.

8. The method of claim 7, wherein writing the entry to the one of the first sub-table or the second sub-table based on the network address further includes writing the entry to the one of the first or second sub-tables based on the least significant bit of one of a source field or a destination field of the network address.

9. The method of claim 7, wherein storing the entry further includes:
   creating a chain of entries beginning at the calculated row address when the calculated row address contains an entry.

10. The method of claim 9, wherein the chains of entries are implemented as a linked list.

11. The method of claim 9, wherein the first and second sub-tables are each partitioned into a bin portion and a heap portion, the bin portion storing a first entry in each of the chains of entries and the heap portion storing additional entries in each chain of entries.

12. The method of claim 7, wherein calculating the row address based on the hash value further includes:
   concatenating the network address with a virtual local area network index to obtain a concatenated value; and
   generating the hash value using a hashing function based on the concatenated value.

13. The method of claim 7, wherein accessing the entries includes reading a port vector field from one of the entries that matches a frame associated with the desired address.

14. The method of claim 13, further comprising generating a frame forwarding descriptor for the frame, the frame forwarding descriptor including information from the port vector field.

15. A multiport switch comprising:
   a plurality of receive ports configured to receive frames, the frames including a source address and a destination address;
   a plurality of transmit ports configured to transmit the frames to the respective destination addresses;

first and second address tables, each of the first and second address tables including a plurality of addressable table entries, each addressable table entry storing frame forwarding information for one of the received frames; and a logic device configured to calculate a first row address of the first and second address tables that the frame forwarding information is to be stored at, determine whether the frame forwarding information is to be stored in the first or the second address table based on a pre-selected bit in the received frame, and store the frame forwarding information in the determined first or second table in the first available entry at the first row address as a table entry.

16. The multiport switch of claim 15, wherein the frames are data frames transmitted in an Ethernet network.

17. The multiport switch of claim 16, wherein the pre-selected bit is the least significant bit of one of a source address field or a destination address field of the data frame.

18. The multiport switch of claim 15, wherein the first row address is calculated based on hash value of the source or destination address of the data frame.

19. The multiport switch of claim 15, wherein storing the frame forwarding information in the determined address table includes storing multiple table entries in a link list structure, each of the multiple entries of each of the link list structures being in the same one of the first and second address tables and having the same calculated row address.

* * * * *